United States Patent
Kim et al.

(10) Patent No.: US 12,206,462 B2
(45) Date of Patent: Jan. 21, 2025

(54) METHOD FOR CONTROLLING TUNABLE ANTENNA, AND ELECTRONIC DEVICE USING SAME

(71) Applicant: Samsung Electronics Co., Ltd., Suwon-si (KR)

(72) Inventors: Eungwon Kim, Suwon-si (KR); Woonggyun Jeong, Suwon-si (KR); Nahyang Kim, Suwon-si (KR); Dongwoo Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 17/711,945

(22) Filed: Apr. 1, 2022

(65) Prior Publication Data

US 2022/0231416 A1    Jul. 21, 2022

Related U.S. Application Data

(63) Continuation of application No. PCT/KR2020/013258, filed on Sep. 28, 2020.

(30) Foreign Application Priority Data

Oct. 1, 2019   (KR) .................. 10-2019-0121775

(51) Int. Cl.
*H04B 17/11*   (2015.01)
*H04B 1/04*   (2006.01)
*H04B 1/40*   (2015.01)
*H04W 24/00*   (2009.01)

(52) U.S. Cl.
CPC ........... *H04B 17/11* (2015.01); *H04B 1/0458* (2013.01); *H04B 1/40* (2013.01)

(58) Field of Classification Search
CPC ........ H04B 17/11; H04B 1/0458; H04B 1/40; H04B 1/04; H04B 17/104; H04B 7/0634; H04B 7/0684; H04W 7/0802; H04W 24/00; H01Q 5/00
See application file for complete search history.

(56) References Cited

U.S. PATENT DOCUMENTS

| | | |
|---|---|---|
| 8,204,446 B2 | 6/2012 | Scheer et al. |
| 8,774,743 B2 | 7/2014 | Ali et al. |
| 9,407,297 B1 | 8/2016 | Desai et al. |

(Continued)

FOREIGN PATENT DOCUMENTS

| | | |
|---|---|---|
| EP | 2677598 B1 | 8/2018 |
| KR | 10-2012-0004338 A | 1/2012 |

(Continued)

OTHER PUBLICATIONS

Notice of Preliminary Rejection dated Dec. 8, 2023, in connection with Korean Application No. 10-2019-0121775, 12 pages.

(Continued)

*Primary Examiner* — Andrew Wendell

(57) ABSTRACT

According to various embodiments of the disclosure, a method for operating an electronic device may comprise the steps of: measuring a load on the basis of one of a plurality of reference points for tuning; and tuning at least one tunable antenna on the basis of the measured load. Other various embodiments may be possible.

17 Claims, 7 Drawing Sheets

(56) References Cited

U.S. PATENT DOCUMENTS

| | | | |
|---|---|---|---|
| 9,774,362 B1* | 9/2017 | Sammeta | H04B 1/40 |
| 2009/0079651 A1* | 3/2009 | Shibata | H01Q 1/243 |
| | | | 343/861 |
| 2012/0009983 A1 | 1/2012 | Mow et al. | |
| 2013/0027129 A1* | 1/2013 | Langer | H03F 1/56 |
| | | | 330/127 |
| 2013/0142271 A1* | 6/2013 | Nilsson | H04B 7/0695 |
| | | | 375/267 |
| 2013/0225088 A1 | 8/2013 | Anderson | |
| 2014/0179239 A1 | 6/2014 | Nickel et al. | |
| 2014/0266965 A1* | 9/2014 | Herrero | H01Q 1/50 |
| | | | 343/861 |
| 2015/0372656 A1 | 12/2015 | Mow et al. | |
| 2015/0380812 A1 | 12/2015 | Black et al. | |
| 2016/0043751 A1 | 2/2016 | Broyde et al. | |
| 2017/0084989 A1* | 3/2017 | Shi | H01Q 1/243 |
| 2017/0180062 A1* | 6/2017 | Johansen | H04B 17/12 |
| 2017/0237448 A1 | 8/2017 | Ko et al. | |
| 2017/0359113 A1 | 12/2017 | Lee et al. | |
| 2019/0181907 A1* | 6/2019 | Pfann | H03H 9/542 |
| 2019/0268954 A1 | 8/2019 | Yu et al. | |

FOREIGN PATENT DOCUMENTS

| | | |
|---|---|---|
| KR | 10-2016-0135812 A | 11/2016 |
| KR | 10-2016-0147975 A | 12/2016 |
| KR | 10-2017-0096695 A | 8/2017 |
| KR | 10-2017-0141016 A | 12/2017 |
| KR | 10-2018-0096475 A | 8/2018 |
| KR | 10-2019-0101818 A | 9/2019 |
| WO | 2018111454 A1 | 6/2018 |

OTHER PUBLICATIONS

International Search Report and Written Opinion of the International Searching Authority dated Jan. 25, 2021, in connection with International Application No. PCT/KR2020/013258, 10 pages.

Notice of Patent Grant dated Aug. 22, 2024, in connection with Korean Application No. 10-2019-0121775, 4 pages.

* cited by examiner

METHOD FOR CONTROLLING TUNABLE ANTENNA, AND ELECTRONIC DEVICE USING SAME

CROSS-REFERENCE TO RELATED APPLICATIONS

This application is a Bypass Continuation of International Application No. PCT/KR2020/013258, filed Sep. 28, 2020, which claims priority to Korean Patent Application No. 10-2019-0121775, filed Oct. 1, 2019, the disclosures of which are herein incorporated by reference in their entirety.

BACKGROUND

1. Field

Various embodiments relate to a method for controlling a tunable antenna and an electronic device using the same.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultra-higher frequency (mmWave) bands (e.g., 60 GHz bands) so as to accomplish higher data rates. To decrease the propagation loss and increase the transmission distance of the radio waves in the ultra-higher frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, technical development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

As new services are being developed with the advancement of wireless communication technology, electronic devices need to support a plurality of operating frequency bands, and accordingly there is an increasing demand for a tunable antenna capable of adjusting an operating frequency band.

SUMMARY

To improve the efficiency of a tunable antenna, optimal antenna tuning may be required according to various user cases. However, in many cases, optimal antenna tuning is not achieved because measured loads are similar. Further, loads are measured as loads in different boundary areas of antenna tuning due to a test sample deviation, and thus an antenna may be tuned not to be able to exert optimal performance.

Various embodiments of the disclosure may provide a tunable antenna control method for configuring a reference point optimized for each event changing antenna tuning and finding an optimal tuning point, based on the reference point, to achieve optimized antenna tuning.

In addition, various embodiments of the disclosure may provide a method for increasing the range of a load to be covered using various reference points for each event and for enabling antenna optimization under conditions of carrier aggregation (CA) and four reception antennas, which cannot be supported in a conventional art.

The technical subjects pursued in the disclosure may not be limited to the above-mentioned technical subjects, and other technical subjects which are not mentioned may be clearly understood, through the following descriptions, by those skilled in the art to which the disclosure pertains.

According to various embodiments of the disclosure, an electronic device may include at least one tunable antenna, at least one processor configured to be operatively connected to the at least one tunable antenna, and a memory configured to be operatively connected to the at least one processor, wherein the memory may store instructions which, when executed, cause the at least one processor to measure a load, based on one reference point among a plurality of reference points for tuning, and tune the at least one tunable antenna, based on the measured load.

According to various embodiments of the disclosure, an operating method of an electronic device may include measuring a load of at least one tunable antenna, based on one reference point among a plurality of reference points for tuning, and tuning the at least one tunable antenna, based on the measured load.

A tunable antenna control method based on a variable reference point according to various embodiments may increase user cases in which optimization is enabled and may increase the range of a load to be covered and resolution.

Further, a tunable antenna control method based on a variable reference point according to various embodiments may increase the distance between loads measured in user cases and may reduce impact of a radiation performance deviation between samples in antenna tuning.

Advantageous effects obtainable from the disclosure may not be limited to the above-mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Definitions for certain words and phrases are provided throughout this patent document, those of ordinary skill in the art should understand that in many, if not most instances, such definitions apply to prior, as well as future uses of such defined words and phrases.

DETAILED DESCRIPTION

Figure 1:
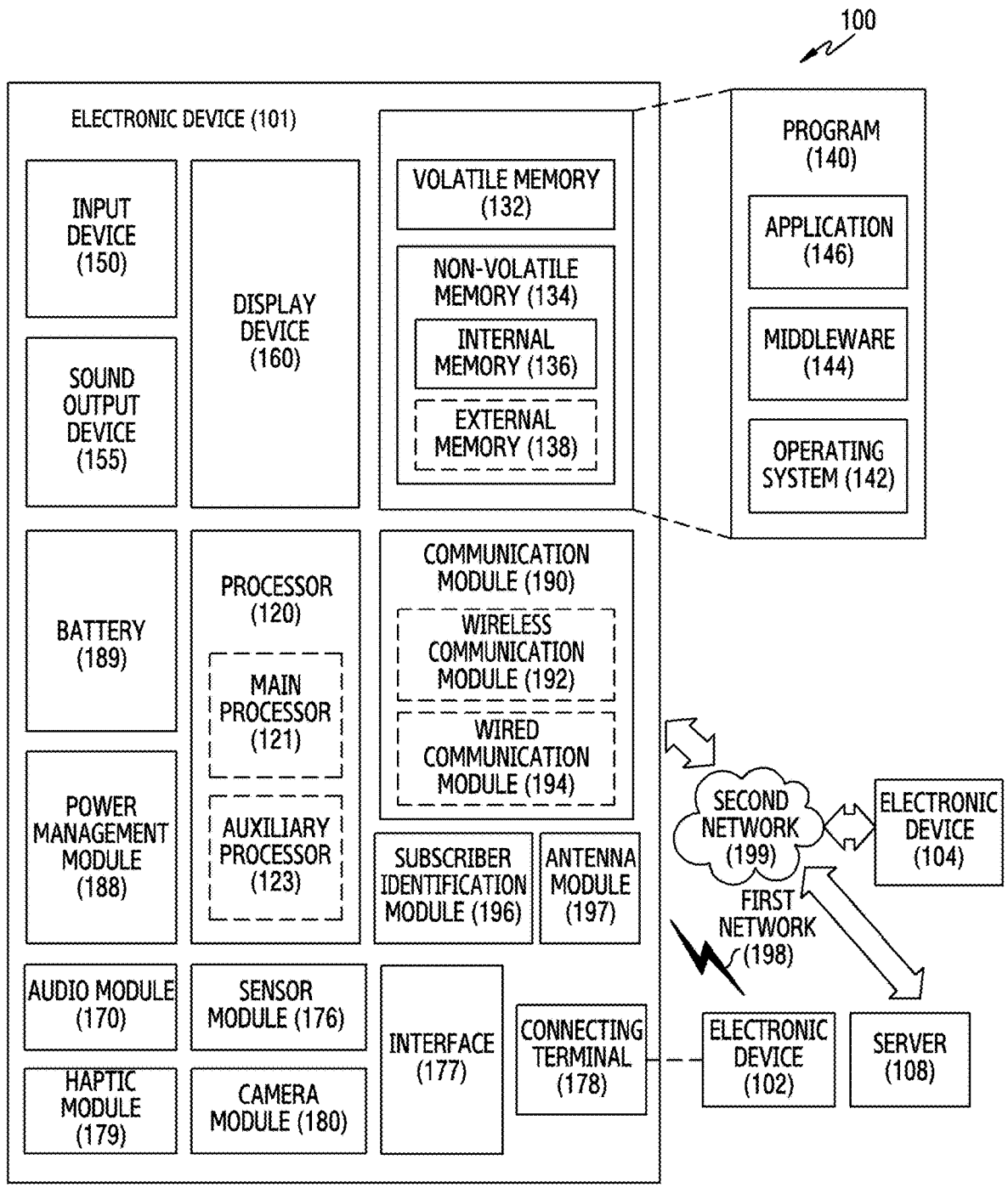
FIG. 1 illustrates a block diagram of an electronic device in a network environment according to various embodiments of the disclosure.

FIGS. 1 through 7, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

Hereinafter, various embodiments will be described in detail with reference to the accompanying drawings. However, for convenience of description, the size of components in the drawings may be exaggerated or reduced. For example, the size and thickness of each component shown in the drawings are arbitrarily indicated for convenience of description, and the disclosure is not necessarily limited by the drawings.

FIG. 1 is a block diagram illustrating an electronic device 101 in a network environment 100 according to various embodiments of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
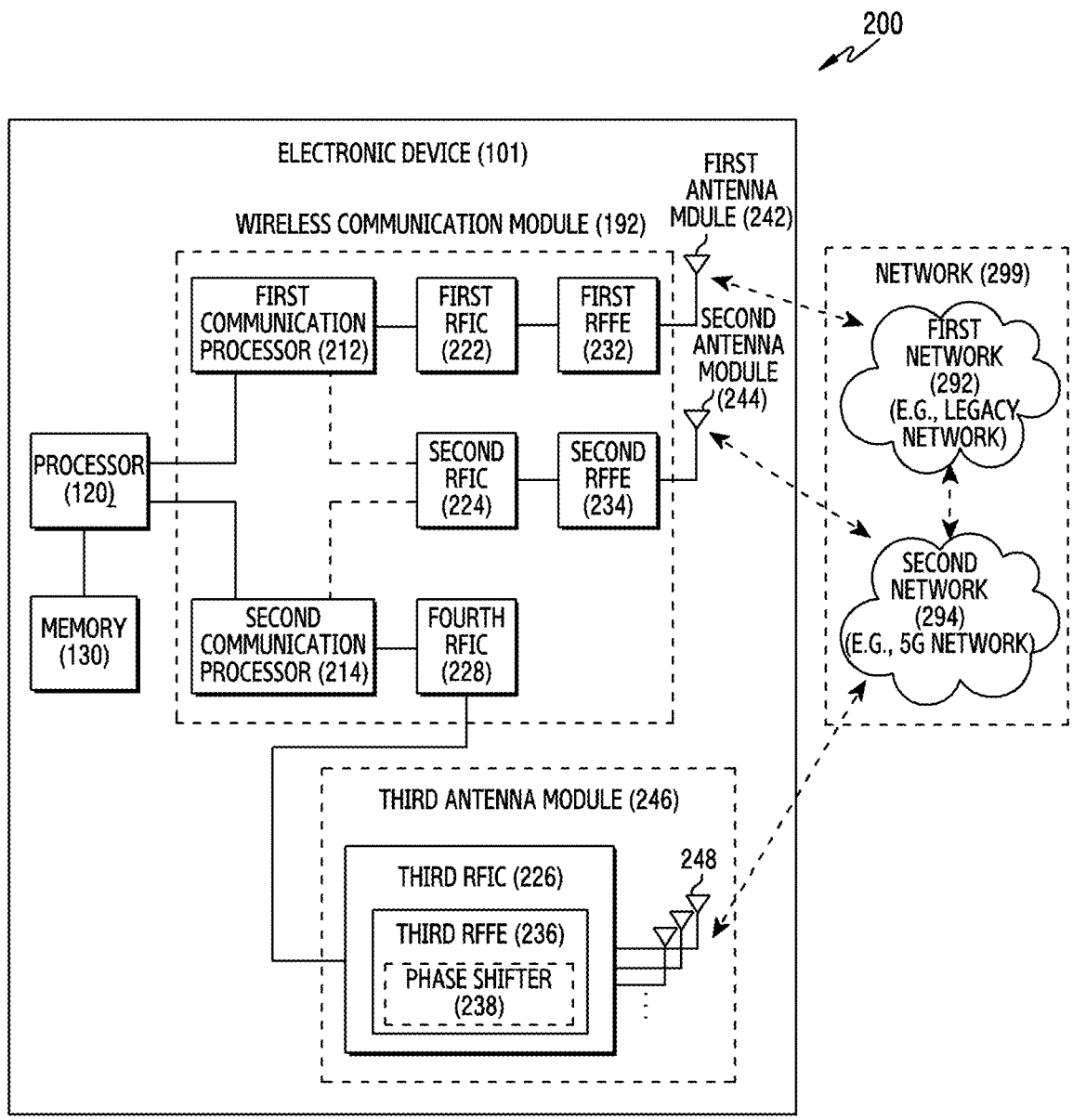
FIG. 2 illustrates a block diagram of an electronic device in a network environment including a plurality of cellular networks according to various embodiments of the disclosure.

FIG. 2 illustrates a block diagram 200 of an electronic device 101 in a network environment including a plurality of cellular networks according to various embodiments of the disclosure.

Referring to FIG. 2, the electronic device 101 may include a first communication processor (CP) 212, a second CP 214, a first radio-frequency integrated circuit (RFIC) 222, a second RFIC 224, a third RFIC 226, a fourth RFIC 228, a first radio-frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to another embodiment, the electronic device 101 may further include at least one of the components illustrated in FIG. 1, and the second network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least part of a communication module 192. According to another embodiment, the fourth RFIC 228 may be omitted or may be included as part of the third RFIC 226.

The first communication processor 212 may establish a communication channel in a band to be used for wireless communication with the first cellular network 292 and may support communication via a legacy network through the established communication channel. According to various embodiments, the first cellular network may be a legacy network including a second-generation (2G), 3G, 4G, or long-term evolution (LTE) network. The second communication processor 214 may establish a communication channel corresponding to a specified band (e.g., about 6 GHz to about 60 GHz) in a band to be used for wireless communication with the second cellular network 294 and may support communication via a 5G network through the established communication channel. According to various embodiments, the second cellular network 294 may be a 5G network defined by the 3GPP. In addition, according to an embodiment, the first communication processor 212 or the second communication processor 214 may establish a communication channel corresponding to a different specified band (e.g., about 6 GHz or lower) in the band to be used for wireless communication with the second cellular network 294 and may support communication via a 5G network through the established communication channel. According to an embodiment, the first communication processor 212 and the second communication processor 214 may be configured in a single chip or a single package. According to various embodiments, the first communication processor 212 or the second communication processor 214 may be configured along with the processor 120, a coprocessor 123, or a communication module 190 in a single chip or a single package. According to an embodiment, the first communication processor 212 and the second communication processor 214 may be directly or indirectly connected to each other via an interface (not shown) to provide or receive data or a control signal in any one direction or in both directions.

In transmission, the first RFIC 222 may convert a baseband signal generated by the first communication processor 212 into a radio-frequency (RF) signal of about 700 MHz to about 3 GHz used for the first cellular network 292 (e.g., a legacy network). In reception, an RF signal may be obtained from the first cellular network 292 (e.g., the legacy network) through an antenna (e.g., the first antenna module 242) and may be preprocessed by an RFFE (e.g., the first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, "5G sub-6 RF signal") in a sub-6 band (e.g., about 6 GHz or lower) used for the second cellular network 294 (e.g., a 5G network). In reception, a 5G sub-6 RF signal may be obtained from the second cellular network 294 (e.g., the 5G network) through an antenna (e.g., the second antenna module 244) and may be preprocessed by an RFFE (e.g., the second RFFE 234). The second RFIC 224 may convert the preprocessed 5G sub-6 RF signal into a baseband signal to be processed by a corresponding communication processor of the first communication processor 212 or the second communication processor 214.

The third RFIC 226 may convert a baseband signal generated by the second communication processor 214 into an RF signal (hereinafter, "5G above-6 RF signal") in a 5G above-6 band (e.g., about 6 GHz to about 60 GHz) used for the second cellular network 294 (e.g., the 5G network). In reception, a 5G above-6 RF signal may be obtained from the second cellular network 294 (e.g., the 5G network) through an antenna (e.g., an antenna 248) and may be preprocessed by the third RFFE 236. The third RFIC 226 may convert the preprocessed 5G above-6 RF signal into a baseband signal to be processed by the second communication processor 214. According to an embodiment, the third RFFE 236 may be configured as part of the third RFIC 226.

According to an embodiment, the electronic device 101 may include the fourth RFIC 228 separately from the third RFIC 226 or as at least part of the third RFIC 226. In this case, the fourth RFIC 228 may convert a baseband signal generated by the second communication processor 214 into an RF signal (hereinafter, "IF signal") in an intermediate frequency band (e.g., about 9 GHz to about 11 GHz) and may transmit the IF signal to the third RFIC 226. The third RFIC 226 may convert the IF signal into a 5G above-6 RF signal. In reception, a 5G above-6 RF signal may be received from the second cellular network 294 (e.g., the 5G network) through an antenna (e.g., the antenna 248) and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be configured as at least part of a single chip or a single package. According to an embodiment, the first RFFE 232 and the second RFFE 234 may be configured as at least part of a single chip or a single package. According to an embodiment, at least one of the first antenna module 242 or the second antenna module 244 may be omitted or may be combined with a different antenna module to process corresponding RF signals in a plurality of bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a portion (e.g., a lower surface) of a second substrate (e.g., a sub-PCB) separate from the first substrate, and the antenna 248 may be disposed in another portion (e.g., an upper surface), thereby forming the third antenna module 246. The third RFIC 226 and the antenna 248 may be disposed on the same substrate, thereby reducing the length of a transmission line therebetween, which may reduce loss (e.g., attenuation) of, for example, a signal in a high-frequency band (e.g., about 6 GHz to about 60 GHz) used for communication via a 5G network due to the transmission line. Accordingly, the electronic device 101 may improve the quality or speed of communication with the second cellular network 294 (e.g., the 5G network).

According to an embodiment, the antenna 248 may be configured as an antenna array including a plurality of antenna elements which can be used for beamforming. In this case, the third RFIC 226 may include, for example, a plurality of phase shifters 238 corresponding to the plurality of antenna elements as part of the third RFFE 236. In transmission, each of the plurality of phase shifters 238 may convert the phase of a 5G above-6 RF signal to be transmitted to an external device (e.g., a base station of the 5G network) of the electronic device 101 through a corresponding antenna element. In reception, each of the plurality of phase shifters 238 may convert the phase of a 5G above-6 RF signal received from the outside through a corresponding antenna element into the same phase or substantially the same phase. This enables transmission or reception through beamforming between the electronic device 101 and the outside.

The second cellular network 294 (e.g., the 5G network) may operate independently of the first cellular network 292 (e.g., the legacy network) (e.g., stand-alone (SA) mode) or may be connected to operate (e.g., non-stand-alone (NSA) mode). For example, the 5G network may have only an access network (e.g., a 5G radio access network (RAN) or a next-generation RAN (NG RAN)) and may not have a core network (e.g., a next-generation core (NGC)). In this case, after accessing the access network of the 5G network, the electronic device 101 may access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in a memory 230 and may be accessed by a different component (e.g., the processor 120, the first communication processor 212, or the second communication processor 214).

According to various embodiments, the processor 120 of the electronic device 101 may execute one or more instructions stored in the memory 130. The processor 120 may include at least one of a circuit for processing data, for example, an integrated circuit (IC), an arithmetic logic unit (ALU), a field-programmable gate array (FPGA), and a large-scale integration (LSI). The memory 130 may store data related to the electronic device 101. The memory 130 may include a volatile memory, such as a random access memory (RAM) including a static random access memory (SRAM) or a dynamic RAM (DRAM), or may include a read-only memory (ROM), a magnetoresistive RAM (MRAM), a spin-transfer torque MRAM (STT-MRAM), a phase-change RAM (PRAM), a resistive RAM (RRAM), and a ferroelectric RAM (FeRAM) as well as a nonvolatile memory, such as a flash memory, an embedded MultiMediaCard (eMMC), and a solid state disk (SSD).

According to various embodiments, the memory 130 may store an instruction related to an application and an instruction related to an operating system (OS). The operating system is system software executed by the processor 120. The processor 120 may manage hardware components included in the electronic device 101 by executing the operating system. The operating system may provide an application programming interface (API) as an application that is software other than the system software.

According to various embodiments, at least one application that is a set of a plurality of instructions may be installed in the memory 130. The application being installed in the memory 130 may mean that the application is stored in a format to executable by the processor 120 connected to the memory 130.

Figure 3:
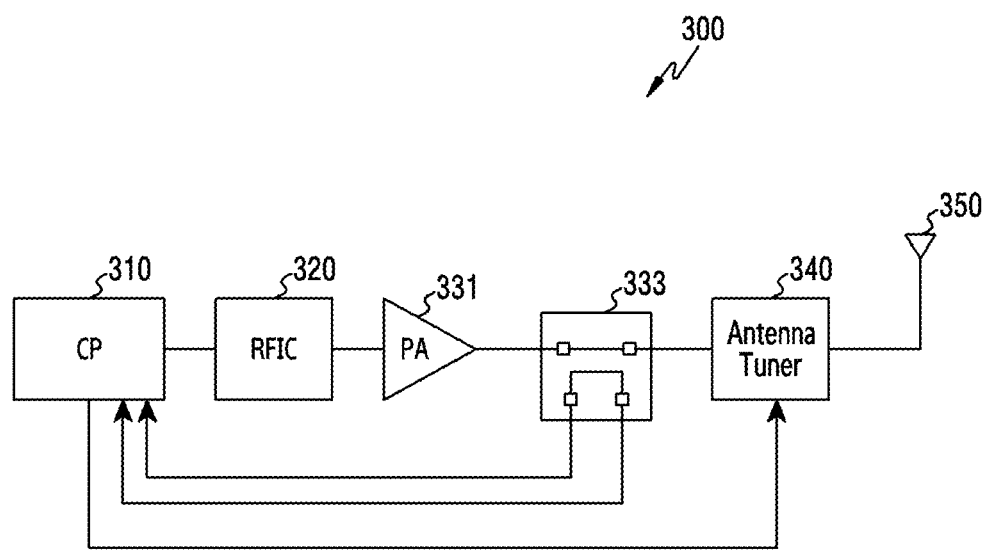
FIG. 3 illustrates a block diagram of an electronic device for measuring a load for tuning a tunable antenna according to various embodiments of the disclosure.

FIG. 3 illustrates a block diagram 300 of an electronic device 101 for measuring a load for tuning a tunable antenna according to various embodiments of the disclosure. The electronic device 101 of FIG. 3 may correspond to the electronic devices 101 of FIG. 1 and FIG. 2 and may show necessary components to describe embodiments of the disclosure.

In an embodiment of FIG. 3, the electronic device 101 may include a CP 310, an RFIC 320, a power amplifier (PA) 331, a coupler 330, an antenna tuner 340, and an antenna 350. In another embodiment, the electronic device 101 may include separate antenna tuners for the first antenna 242 and the second antenna 244.

At least one of hardware components included in the electronic device 101 of FIG. 3 may correspond to a hardware component included in the electronic devices 101 of FIG. 1 and FIG. 2. For example, the CP 310 may correspond to the first CP 212 or the second CP 214 of FIG. 2, the RFIC 320 may correspond to the first RFIC 222 or the second RFIC 224 of FIG. 2, and the PA 331 and the coupler 333 may be included in the first RFFE 232 or the second RFFE 234 of FIG. 2. Further, the antenna 350 may correspond to the first antenna 242 and the second antenna 244 of FIG. 2.

In an embodiment, the antenna tuner 340 may adjust an operating frequency of one or more antennas (e.g., the antenna 350 in an embodiment of FIG. 3) included in the electronic device 101 and/or may perform impedance matching. The antenna tuner 340 may adjust the operating frequency and/or may perform the impedance matching, based on control information received from the CP 310. The antenna tuner 340 may adjust the operating frequency of the antenna 350 or may perform impedance matching, for example, based on an antenna tuning code. The antenna tuning code is information previously stored in the antenna tuner 340, an impedance characteristic of the antenna may be configured according to the antenna tuning code, and the antenna tuning code may be selected by the CP 310.

According to various embodiments, the CP 310 may actively configure the antenna tuner 340. In an embodiment, the CP 310 may measure a load using the coupler 333 every 1 second, may select an antenna tuning code, based on the measured load, and may configure the antenna tuner 340 according to the selected code.

According to various embodiments, the measured load may be the impedance of the antenna or a value predicable based on the impedance of the antenna.

Figure 4:
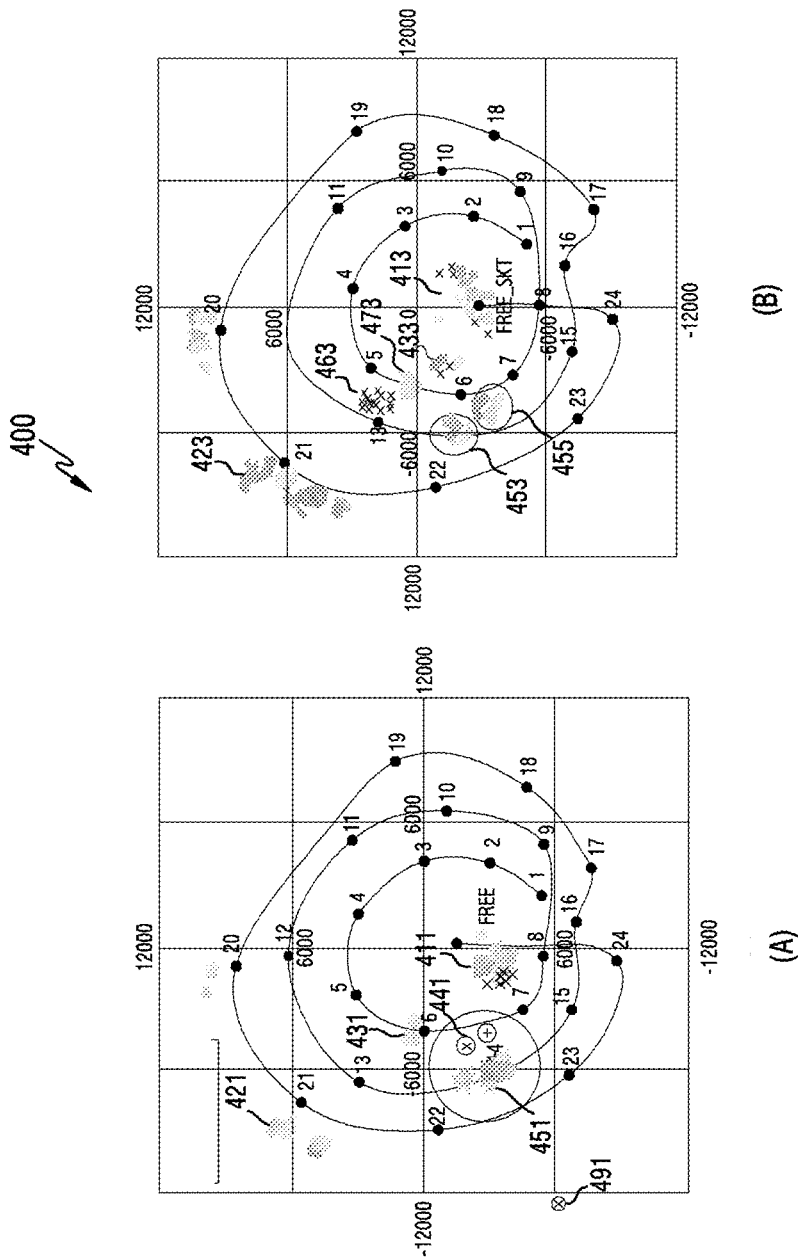
FIG. 4 is a diagram illustrating load information measured through a coupler and an example of selecting an antenna tuning code based on a load according to various embodiments of the disclosure.

FIG. 4 illustrates a diagram 400 illustrating load information measured through the coupler 333 and an example of selecting an antenna tuning code based on a load according to various embodiments of the disclosure.

FIG. 4 shows an example in which the CP 310 displays load information, based on magnitude and phase information of a load obtained through the coupler 333. The CP 310 may configure the antenna tuner 340 as a specific reference point to obtain the load information. According to an embodiment, to configure the antenna tuner 340 as the specific reference point, the CP 310 may configure the antenna tuner 340 as a default code or may set the antenna tuner 340 in a free state of not being configured. The configured default code or the free state may be a code that makes frequency characteristics of the antenna 350 the same for all frequencies and may be a free code. When the default code is applied, a radio signal through the PA 311 may be radiated through the antenna 350 without any change in characteristics.

FIG. 4A shows an example when a frequency band is a 2.525 GHz band, and FIG. 4B shows an example when the frequency band is a 2.45 GHz band.

In FIG. 4A and FIG. 4B, numbers 1 to 24 may be indexes corresponding to antenna tuning codes, respectively.

Referring to FIG. 4, the CP 310 may display a corresponding position of FIG. 4, based on the magnitude and phase of the load obtained using the coupler 333. The CP 310 may select a tuning code corresponding to an index closest to the position. In an embodiment, when a load is positioned at 411 or 413, the CP 310 may select a tuning code corresponding to index 0. In another example, when the position of a load obtained when a user holds the electronic device with the right hand corresponds to 431 or 433, the CP 310 may select a tuning code corresponding to index 6. In another embodiment, when the position of a load obtainable when a USB is inserted into the electronic device 101 corresponds to 421 or 423, the CP 310 may select a tuning code corresponding to index 21. In another embodiment, when a load is positioned at 463, the CP 310 may select a tuning code corresponding to index 13.

In another embodiment, when a load is positioned at 473, the CP 310 may select either index 5 or index 6, but the position of the load is away from a position corresponding to index 5 or a position corresponding to index 6 to a degree, and thus tuning codes corresponding to indices 5 and 6 may not be an optimal tuning codes for this load. Further, when an earphone is inserted into the electronic device 101 and the electronic device 101 is held with the right hand, a load corresponding to a position of 453 may be detected, and when the earphone is inserted into the electronic device 101 and the electronic device 101 is held with the left hand, a load corresponding to a position of 455 may be detected, but in both cases, a tuning code corresponding to index 14 may be selected. In this case, although the different loads are generated by the user's actions, the same tuning code is used, and thus resolution may be considered low.

In yet another embodiment, when the earphone is inserted into the electronic device 101, a load corresponding to a position of 451 may be detected, and when the electronic device 101 is held with the left hand, a load corresponding to a position of 441 may be detected. Even in these two cases, the same tuning code corresponding to index 14 may be selected. In this embodiment, the same tuning code is selected for the different loads, in which case the optimal tuning code may not be considered to be used.

In yet another embodiment, when the CP 310 detects a load corresponding to a position of 491, it may be difficult to achieve optimized tuning for the load, no matter which tuning code is selected. That is, the load at the position may be outside a currently configured antenna tuning range.

As described above, when only one reference point (e.g., index 0) is used, the same tuning code may be used for different loads, and thus resolution may be inevitably large, and the range of loads to be covered may be narrow.

In order to solve these problems, the disclosure provides a method using a variable reference point. In detail, different reference points may be configured based on an event detectable by the processor 120, and an antenna tuning code may be selected based on the reference points. Here, the event detectable by the processor 120 may be any action that may cause a change in load characteristics of the electronic device 101 including USB insertion, earphone insertion, and CA activation.

Figure 5:
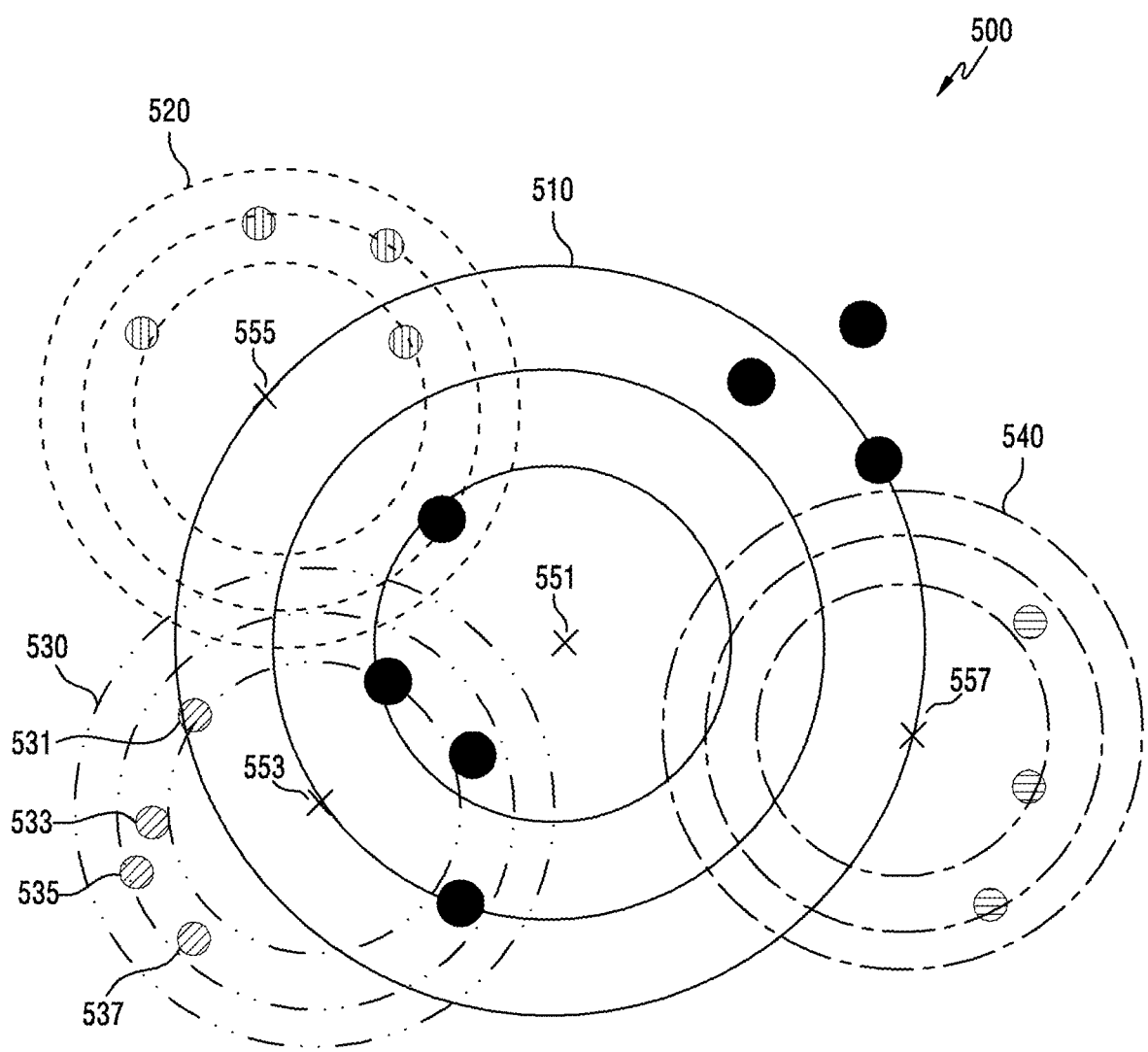
FIG. 5 is a diagram conceptually illustrating an example of selecting an antenna tuning code based on a variable reference point according to various embodiments of the disclosure.

FIG. 5 is a diagram 500 conceptually illustrating an example of selecting an antenna tuning code, based on a variable reference point according to various embodiments of the disclosure.

Referring to FIG. 5, the CP 310 may configure a reference point, based on a detected event. The configured reference point may vary depending on the type of the detected event. In an embodiment, the CP 310 may configure one reference point among a plurality of reference points 551, 553, 555, and 557 as a reference point corresponding to the detected event, based on the type of the detected event. The reference points 551, 553, 555, and 557 may be configurations of the antenna tuner 340 for measuring a load, and may be antenna tuning codes corresponding to indices configured in a default tuning code. The CP 310 may configure the antenna tuner 340 with an antenna tuning code corresponding to a reference point, and accordingly a corresponding load may be at a position indicated by each index in FIG. 4.

In an embodiment, when the default tuning code or a free code is used as a reference point 551, a measured load may be a load corresponding to index 0 (e.g., a magnitude of 50 ohms and a phase of 180 degrees). In an embodiment, the CP 310 may configure the reference point 551 when no event is detected. In another embodiment, when an event that an earphone is inserted into the electronic device 101 is detected, the CP 310 may configure a reference point 553. According to an embodiment, the reference point 553 may be an antenna tuning code corresponding to index 14 used in the default tuning code or the free code. In another embodiment, the CP 310 may configure a reference point 555 when an event that a USB is inserted into the electronic device 101 is detected.

According to an embodiment, the reference point 555 may be an antenna tuning code corresponding to index 21 used in the default tuning code or the free code. In another embodiment, the CP 310 may configure a reference point 557 when an event that carrier aggregation (CA) is activated is detected. According to an embodiment, the reference point 557 may be an antenna tuning code corresponding to index 18 used in the default tuning code or the free code. Using a different reference point for each event may increase resolution compared to using a single reference point as shown in FIG. 4, may configure an antenna tuning code optimized for a load, and may also expand an overall load range to be configured.

According to an embodiment, the CP 310 may configure the reference point 551 to measure a load, and accordingly a load range for configuring an antenna tuning code may be a range corresponding to 510. In another embodiment, the CP 310 may configure the reference point 553 to measure a load, and accordingly a load range for configuring an antenna tuning code may be a range corresponding to 530. In another embodiment, the CP 310 may configure the reference point 555 to measure a load, and accordingly a load range for configuring an antenna tuning code may be a range corresponding to 520. In another embodiment, the CP 310 may configure the reference point 557 to measure a load, and accordingly a load range for configuring an antenna tuning code may be a range corresponding to 540.

According to an embodiment, each load range 520, 530, or 540 in a case where an antenna tuning code corresponding to a different index is a reference point may be narrower than the load range 510 in a case where the default tuning code or the free code (index 0) is a reference point. Accordingly, resolution by each index may be higher. In other words, a load range covered by each index may be narrower.

The CP 310 may match different antenna tuning codes to an index by each reference point. According to an embodiment, the CP 310 may configure an antenna tuning code corresponding to a specific load point positioned within the load range 510 with respect to the measured load after configuring the reference point 551, and may display an index corresponding to each antenna tuning code as shown in FIG. 4. According to another embodiment, the CP 310 may configure an antenna tuning code corresponding to a specific load point positioned within the load range 530 with respect to the measured load after configuring the reference point 553, and may configure an index corresponding to each antenna tuning code. According to another embodiment, the CP 310 may configure an antenna tuning code corresponding to a specific load point positioned within the load range 520 with respect to the measured load after configuring the reference point 552, and may configure an index corresponding to each antenna tuning code.

According to another embodiment, the CP 310 may configure an antenna tuning code corresponding to a specific load point positioned within the load range 540 with respect to the measured load after configuring the reference point 557, and may configure an index corresponding to each antenna tuning code. Accordingly, even though the CP 310 instructs the antenna tuner 340 to use the same index, the antenna tuning code corresponding to the index may be different for each reference point.

The CP 310 may use a plurality of reference points, thereby increasing resolution for a load and selecting an antenna tuning code optimized for the load. In an embodiment, when the earphone is inserted into the electronic device 101, the CP 310 may select index 14 as shown in FIG. 4. According to another embodiment, the CP 310 may configure a reference point in a case where the earphone is inserted, for example, may configure the antenna tuner 340 to use the antenna tuning code corresponding to index 14, and may measure a load. Then, as shown in FIG. 5, the measured load may be distinguished as a load 531 in a case of holding the electronic device with the right hand, a load 533 in a hands-free state, a load 535 in a case of an earphone in a silicone case, as a load 537 in a case of holding the electronic device with the left hand, and different antenna tuning codes may be used based on the distinguished load. Therefore, in a case of a load detected based on a reference point configured according to an event of earphone insertion, an antenna tuning code that is distinguished according to each action may be used, but when only the default tuning code or the free code is used as a reference point, only one tuning code (e.g., index 14) may be used. Accordingly, when a changeable reference point is used, resolution for distinguishing loads may be further increased.

According to various embodiments, the electronic device 101 may store information about a reference point for each event in a memory (e.g., the memory 130 of FIG. 1). Further, according to an embodiment, the electronic device 101 may store load information for each event and each index shown below in Table 1 in the form of a lookup table (LUT) in the memory 130. Here, a combination of an event and an index may correspond to one antenna tuning code. Although an embodiment of Table 1 includes information about an antenna tuning code, another embodiment may not include the information about the antenna tuning code. The load information may be a result of measurement using the coupler 330 of FIG. 3 after configuring a tunable antenna according to an antenna tuning code.

TABLE 1

| Event | Index | Antenna tuning code | Load information |
|---|---|---|---|
| Free (default) | 0 | 3600/00C1 | 0, −50 |
|  | 1 | 3600/9048 | 100, −4500 |
|  | ... | ... | ... |
|  | 24 | 1007/010F | −50, −9000 |
| Earphone connection | 0 | 2700/40C0 | −10000, −4000 |
|  | 1 | 2700/8142 | −8250, −4600 |
|  | ... | ... | ... |
|  | 24 | 1009/0F1F | −10050, −13000 |
| USB connection | 0 | 2B00/00C1 | −8000, 6000 |
|  | 1 | 2B00/9048 | −7950, 4000 |
|  | ... | ... | ... |
|  | 24 | 2F00/010F | −8020, −3000 |

TABLE 1-continued

| Event | Index | Antenna tuning code | Load information |
|---|---|---|---|
| CA activation | 0 | 3200/0AC1 | 7000, −4000 |
| | 1 | 3200/9285 | 7100, −6500 |
| | ... | ... | ... |
| | 24 | 320F/040A | 6925, −9000 |
| | ... | | |

When an event is detected, the CP 310 may obtain a reference point corresponding to the event, based on the information stored in the memory 130, may configure the antenna tuner 340, and may then measure a load. The CP 310 finds a load based on the measured load and closest to the measured load in Table 1 according to an embodiment. In this case, the CP 310 may perform comparison of only the load corresponding to the event, and may obtain an index or an antenna tuning code corresponding to the found load. The CP 310 may transmit obtained index and event (or reference point) information to the antenna tuner 340 to configure a tunable antenna according to the current load. According to another embodiment, the CP 310 may transmit the antenna tuning code to the antenna tuner 340, and the antenna tuner 340 may configure the tunable antenna, based on the received antenna tuning code.

According to various embodiments, the antenna tuner 340 may have a lookup table (LUT) including an antenna tuning code mapped to an event (or reference point) and an index shown in Table 2 according to an embodiment.

TABLE 2

| Event | Reference point | Index | Antenna tuning code |
|---|---|---|---|
| Free (default) | 0 | 0 | 3600/00C1 |
| | (0000/0000) | 1 | 3600/9048 |
| | | ... | ... |
| | | 24 | 1007/010F |
| Earphone connection | 14 | 0 | 2700/40C0 |
| | (2700/40A0) | 1 | 2700/8142 |
| | | ... | ... |
| | | 24 | 1009/0F1F |
| USB connection | 21 | 0 | 2B00/00C1 |
| | (2B00/00A0) | 1 | 2B00/9048 |
| | | ... | ... |
| | | 24 | 2F00/010F |
| CA activation | 18 | 0 | 3200/0AC1 |
| | (3200/0A00) | 1 | 3200/9285 |
| | | ... | ... |
| | | 24 | 320F/040A |
| | ... | | |

When receiving the event (or reference point) information and the index information from the CP 310, the antenna tuner 340 may obtain an antenna tuning code by referring to the LUT shown in Table 2, and may configure antenna tuning according to the tuning code. According to an embodiment, a timing at which the event (or reference point) information and the index information are received may vary.

According to various embodiments, the CP 310 may change an antenna tuning configuration at an interval of one second. Alternatively, it is also possible to change the antenna tuning configuration at a different interval, that is, a two-second interval or at a preset interval. According to an embodiment, the CP 310 may find an optimal tuning code for first 2 ms of a reference point period, and may tune the antenna using the found optimal tuning code to transmit and receive a signal for the remaining 988 ms. According to an embodiment, the CP 310 may find an optimal tuning code by configuring a reference point, based on an event detected in the reference point period.

According to an embodiment, the CP 310 may obtain reference point information stored in advance in the memory, based on an event, such as USB insertion, earphone insertion, and CA activation, may configure the antenna tuner 340, and may then detect load information. In addition, the CP 310 may obtain an index indicating an antenna tuning code corresponding to the load information as in the example shown in FIG. 5, based on the load information.

According to various embodiments, an electronic device (e.g., the electronic device 101 of FIG. 1) may include at least one tunable antenna, at least one processor configured to be operatively connected to the at least one tunable antenna, and a memory configured to be operatively connected to the at least one processor, wherein the memory may store instructions which, when executed, cause the at least one processor to measure a load of the at least one tunable antenna, based on one of a plurality of reference points for tuning, and tune the at least one tunable antenna, based on the measured load.

According to various embodiments, the instructions may cause the at least one processor to obtain an event, obtain one reference point among the plurality of reference points for tuning, based on the obtained event, configure the at least one tunable antenna, based on the obtained reference point, measure the load of the at least one tunable antenna after configuring the at least one tunable antenna, select an antenna tuning code, based on the measured load, and reconfigure the at least one tunable antenna, based on the selected antenna tuning code.

According to various embodiments, the memory may store a reference point for tuning corresponding to each event, and the instructions may cause the at least one processor to obtain the reference point for tuning corresponding to the obtained event from the memory.

According to various embodiments, the memory may store a first lookup table (LUT) including load information associated with a plurality of antenna tuning codes, and the instructions may cause the at least one processor to select one of the plurality of antenna tuning codes, based on a result of comparing the load information included in the first LUT with the measured load.

According to various embodiments, each of the plurality of antenna tuning codes may be mapped to an event and an index, the first LUT may include load information associated with an event and an index, and the selected antenna tuning code may be indicated by the mapped event and index.

According to various embodiments, the at least one tunable antenna may include an antenna tuner, and the antenna tuner may include a second LUT for finding an antenna tuning code, based on the event and the index, may obtain an antenna tuning code from the second LUT, based on event and index information received from the at least one processor, and may tune the at least one tunable antenna, based on the obtained antenna tuning code.

According to various embodiments, the at least one tunable antenna may include an antenna tuner, and the antenna tuner may receive the selected antenna tuning code from the at least one processor and may tune the at least one tunable antenna, based on the received antenna tuning code.

According to various embodiments, the instructions may cause the at least one processor to tune the at least one tunable antenna every second.

According to various embodiments, the event may include at least one of insertion of an earphone into the electronic device, USB insertion, and carrier aggregation (CA) activation.

According to various embodiments, the memory may cause, when executed, the at least one processor to detect that the event is executed, configure the at least one tunable antenna, based on detection of execution of the event and a default tuning code, measure the load after configuring the at least one tunable antenna, generate an antenna tuning code, based on the measured load, allocate an index corresponding to the antenna tuning code, and generate the first LUT, based on the event, the index, the generated antenna tuning code, and the measured load.

Figure 6:
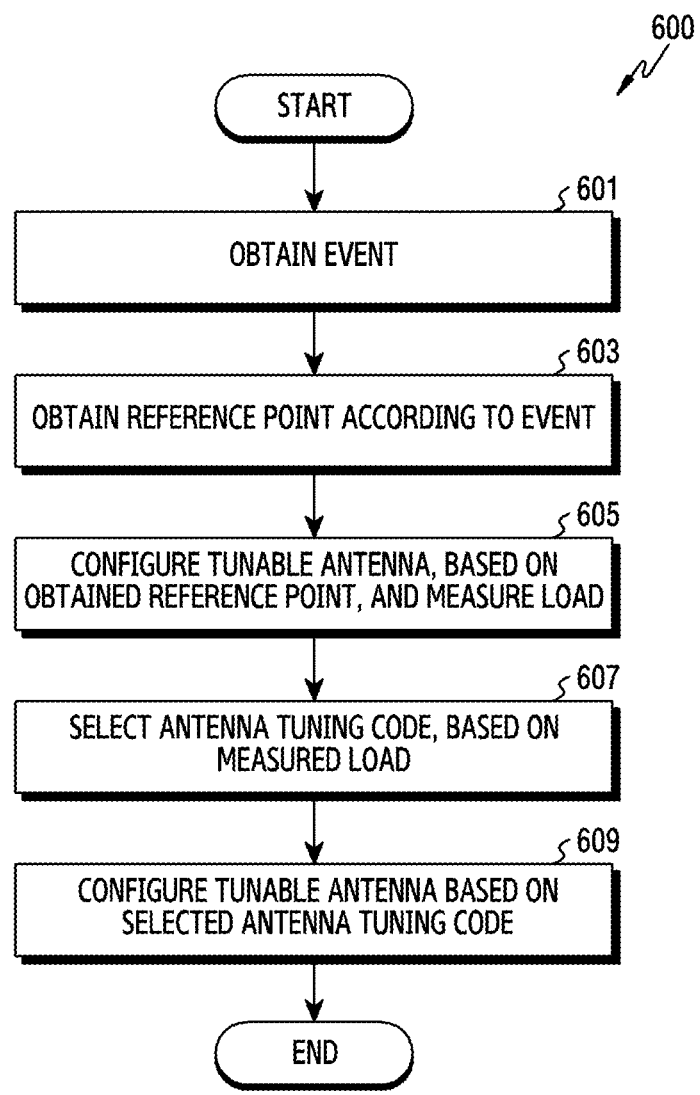
FIG. 6 is a flowchart illustrating an operation of configuring a tunable antenna of an electronic device according to various embodiments of the disclosure.

FIG. 6 is a flowchart 600 illustrating an operation of configuring a tunable antenna of an electronic device 101 according to various embodiments of the disclosure. The subject of operations in the flowchart illustrated in FIG. 6 may be understood as an electronic device (e.g., the electronic device 101 of FIG. 1) or a processor (e.g., the processor 120, the first communication processor 212, or the second communication processor 214 of FIG. 2) of the electronic device.

According to various embodiments, in operation 601, the electronic device 101 may obtain an event. The event may be detected by the processor 120 corresponding to an application processor rather than the communication processors 212 and 214. In an embodiment, the event may include USB insertion, earphone insertion, and/or CA activation. The event detected by the processor 120 may be transmitted to the CPs 212 and 214.

According to various embodiments, in operation 603, the electronic device 101 may obtain a reference point according to the event. The reference point may be a specific tuning configuration of a tunable antenna configured to obtain load information. The electronic device 101 may obtain a reference point corresponding to each event from a memory (e.g., the memory 130 of FIG. 1). According to an embodiment, the reference point corresponding to each event may be determined through a simulation or an experiment, and the determined reference point may be stored in the memory 130 of the electronic device 101.

According to various embodiments, in operation 605, the electronic device 101 may configure the tunable antenna, based on the obtained reference point, and may measure a load. According to an embodiment, the electronic device 101 may configure the tunable antenna by providing an index corresponding to an antenna tuning code corresponding to the reference point to an antenna tuner 340. The electronic device 101 may measure the load of the antenna using a coupler 333.

According to various embodiments, in operation 607, the electronic device 101 may select an antenna tuning code or an index corresponding to the antenna tuning code, based on the measured load. The electronic device 101 may select an antenna tuning code corresponding to a load closest to the measured load based on FIG. 4 or FIG. 5.

According to various embodiments, in operation 609, the electronic device 101 may configure the tunable antenna, based on the selected antenna tuning code. According to an embodiment, the electronic device 101 may configure the tunable antenna by providing the index corresponding to the selected antenna tuning code to the antenna tuner 340.

According to various embodiments, the electronic device 101 may dynamically perform a tunable antenna configuration operation every second according to operations 605, 607, and 609. According to another embodiment, the electronic device 101 may perform the antenna configuration operation every two seconds or every preset time interval. According to an embodiment, the electronic device 101 may perform the tunable antenna configuration operation according to operations 605, 607, and 609 for 2 ms, and may perform a normal signal transmission and reception operation using the configured tunable antenna for the remaining 998 ms.

Figure 7:
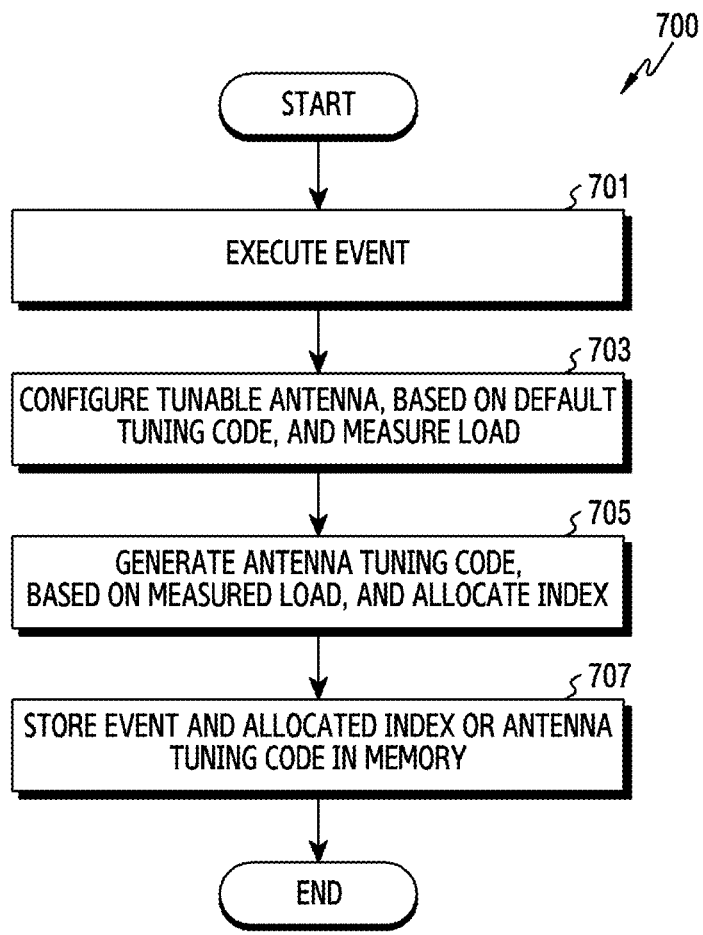
FIG. 7 is a flowchart illustrating an operation of configuring a reference point for each event of an electronic device 101 according to various embodiments of the disclosure.

FIG. 7 is a flowchart 700 illustrating an operation of configuring a reference point for each event of the electronic device 101 according to various embodiments of the disclosure. The subject of operations in the flowchart illustrated in FIG. 7 may be understood as an electronic device (e.g., the electronic device 101 of FIG. 1) or a processor (e.g., the processor 120, the first communication processor 212, or the second communication processor 214 of FIG. 2) of the electronic device.

According to various embodiments, in operation 701, the electronic device 101 may execute an event for configuring a reference point. In an embodiment, an event of inserting a USB into the electronic device 101, an event of inserting an earphone, or an event of activating CA may be executed.

According to various embodiments, in operation 703, the electronic device 101 may configure a tunable antenna based on a default tuning code and may measure a load. An electronic device that does not use a different reference point for each event may measure a load using the default tuning code as a reference point. Accordingly, a reference point for a specific event may be an antenna tuning code enabling the antenna to be configured to most match a load measured in the antenna configured with the default tuning code. To reflect this, the electronic device 101 may configure the tunable antenna, based on the default tuning code, and may measure the load.

According to various embodiments, in operation 705, the electronic device 101 may generate an antenna tuning code, based on the measured load, and may allocate an index. The tuning code may be generated to determine an antenna tuner value, based on the measured load, and to generate the determined antenna tuner value. In an embodiment, the antenna tuning code may be a tuning code for configuring the antenna to exhibit a load characteristic most similar to that of the measured load. The electronic device 101 may allocate the index for indicating the antenna tuning code.

According to various embodiments, in operation 707, the electronic device 101 may store the executed event and the allocated index or the allocated antenna tuning code in a memory. In an actual operation, the electronic device 101 may obtain an index or an antenna tuning code stored in the memory, based on the detected event, and may perform an operation according to FIG. 6.

According to various embodiments, an electronic device (e.g., the electronic device 101 of FIG. 1) may include at least one tunable antenna, at least one processor configured to be operatively connected to the at least one tunable antenna, and a memory configured to be operatively connected to the at least one processor, wherein the memory may store instructions which, when executed, cause the at least one processor to measure a load of the at least one tunable antenna, based on one reference point among a plurality of reference points for tuning, and tune the at least one tunable antenna, based on the measured load.

According to various embodiments, the memory may be configured to store the plurality of reference points for tuning by each event, and the instructions may cause the at least one processor to obtain an event, obtain one reference point among the plurality of reference points for tuning stored in the memory, based on the obtained event, configure the at least one tunable antenna, based on the obtained reference point, measure the load of the at least one tunable antenna after configuring the at least one tunable antenna, select an antenna tuning code, based on the measured load, and reconfigure the at least one tunable antenna, based on the selected antenna tuning code.

According to various embodiments, the memory may be configured to store a first lookup table (LUT) including load information associated with a plurality of antenna tuning codes, and the instructions may cause the at least one processor to obtain an event, obtain one reference point corresponding to the obtained event among the plurality of reference points stored in the memory, configure the at least one tunable antenna, based on the obtained reference point, measure the load of the at least one tunable antenna after configuring the at least one tunable antenna, select one of the plurality of antenna tuning codes, based on a result of comparing the load information included in the first LUT with the measured load, and reconfigure the at least one tunable antenna, based on the selected antenna tuning code.

According to various embodiments, each of the plurality of antenna tuning codes may be mapped to an event and an index, the load information included in the first LUT may be associated with the event and the index mapped to the plurality of antenna tuning codes, the selected antenna tuning code may be indicated by the mapped event and index, the at least one tunable antenna may include an antenna tuner, and the antenna tuner may include a second LUT for finding an antenna tuning code, based on the event and the index, may obtain an antenna tuning code from the second LUT, based on event and index information received from the at least one processor, and may tune the at least one tunable antenna, based on the obtained antenna tuning code.

According to various embodiments, the at least one tunable antenna may include an antenna tuner, and the antenna tuner may receive the selected antenna tuning code from the at least one processor and may tune the at least one tunable antenna, based on the received antenna tuning code.

According to various embodiments, the instructions may cause the at least one processor to tune the at least one tunable antenna every second, and the event may include at least one of insertion of an earphone into the electronic device, universal serial bus (USB) insertion, and carrier aggregation (CA) activation.

According to various embodiments, the memory may cause, when executed, the at least one processor to detect that the event is executed, configure the at least one tunable antenna, based on a default tuning code, upon detecting execution of the event, measure the load after configuring the at least one tunable antenna, generate an antenna tuning code, based on the measured load, allocate an index corresponding to the antenna tuning code, and generate the first LUT, based on the event, the generated antenna tuning code, and the measured load.

According to various embodiments, an operating method of an electronic device (e.g., the electronic device 101 of FIG. 1) may include: measuring a load of at least one tunable antenna, based on one reference point among a plurality of reference points for tuning; and tuning the at least one tunable antenna, based on the measured load.

According to various embodiments, the measuring of the load of the at least one tunable antenna may include: obtaining an event; obtaining one reference point among the plurality of reference points for tuning, based on the obtained event; configuring the at least one tunable antenna, based on the obtained reference point; and measuring the load of the at least one tunable antenna after configuring the at least one tunable antenna, and the tuning of the at least one tunable antenna may include: selecting an antenna tuning code, based on the measured load; and reconfiguring the at least one tunable antenna, based on the selected antenna tuning code.

According to various embodiments, the obtaining of the one reference point may include obtaining a reference point corresponding to the obtained event from a memory storing a reference point for tuning corresponding to each event.

According to various embodiments, the selecting of the antenna tuning code may include: comparing load information included in a first lookup table (LUT) with the measured load; and selecting one of a plurality of antenna tuning codes included in the first LUT, based on a comparison result, and pieces of the load information included in the first LUT may be associated with the plurality of antenna tuning codes.

According to various embodiments, the method may further include generating the first LUT, wherein each of the plurality of antenna tuning codes may be mapped to an event and an index, the pieces of the load information included in the first LUT may be associated with the event and the index mapped to the plurality of antenna tuning codes, and the selected antenna tuning code may be indicated by the mapped event and index.

According to various embodiments, the configuring of the at least one tunable antenna may include: obtaining the selected antenna tuning code based on the event and the index, using a second LUT for finding an antenna tuning code based on the event and the index; and configuring the at least one tunable antenna, based on the selected antenna tuning code.

According to various embodiments, the configuring of the at least one tunable antenna may be performed every second, and the event may include at least one of insertion of an earphone into the electronic device, USB insertion, and carrier aggregation (CA) activation.

According to various embodiments, the generating of the first LUT may include: detecting that the event is executed; configuring the at least one tunable antenna, based on a default tuning code, upon detecting execution of the event; measuring the load after configuring the at least one tunable antenna; generating an antenna tuning code, based on the measured load; allocating an index corresponding to the generated antenna tuning code; and generating the first LUT, based on the event, the generated antenna tuning code, and the measured load.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the disclosure has been described with various embodiments, various changes and modifications may be suggested to one skilled in the art. It is intended that the disclosure encompass such changes and modifications as fall within the scope of the appended claims.

What is claimed is:

1. An electronic device comprising:
   at least one tunable antenna;
   at least one processor configured to be operatively connected to the at least one tunable antenna; and
   a memory configured to be operatively connected to the at least one processor,
   wherein the memory stores instructions which, when executed, cause the at least one processor to:
   measure a load of the at least one tunable antenna based on a reference point among a plurality of reference points for tuning, and tune the at least one tunable antenna, based on the measured load,
   wherein the instructions, which when executed, cause the at least one processor to measure the load of the at least one tunable antenna, comprise instructions which, when executed, cause the processor to:
   obtain an event;
   obtain one reference point among the plurality of reference points for tuning based on the obtained event;
   configure the at least one tunable antenna based on the obtained reference point;
   measure the load of the at least one tunable antenna after configuring the at least one tunable antenna;
   select an antenna tuning code based on the measured load; and
   reconfigure the at least one tunable antenna based on the selected antenna tuning code.

2. The electronic device of claim 1, wherein the memory stores the plurality of reference points for tuning by each event, and
   the instructions cause the at least one processor to obtain one reference point among the plurality of reference points for tuning stored in the memory, based on the obtained event.

3. The electronic device of claim 1, wherein the memory stores a first lookup table (LUT) comprising load information associated with a plurality of antenna tuning codes.

4. The electronic device of claim 2, wherein:
   each of a plurality of antenna tuning codes is mappable to an event and an index;
   load information in a first lookup table (LUT) is associated with the event and the index mapped to the plurality of antenna tuning codes; and
   the selected antenna tuning code is indicated by the mapped event and index.

5. The electronic device of claim 4, wherein the at least one tunable antenna comprises an antenna tuner, the antenna tuner comprises a second LUT for an antenna tuning code based on the event and the index, obtains the antenna tuning code from the second LUT based on event and index information received from the at least one processor, and tunes the at least one tunable antenna based on the obtained antenna tuning code.

6. The electronic device of claim 1, wherein:
the at least one tunable antenna comprises an antenna tuner; and
the antenna tuner receives the selected antenna tuning code from the at least one processor and tunes the at least one tunable antenna, based on the received antenna tuning code.

7. The electronic device of claim 1, wherein the instructions cause the at least one processor to tune the at least one tunable antenna every second.

8. The electronic device of claim 1, wherein the event comprises at least one of insertion of an earphone into the electronic device, universal serial bus (USB) insertion, and carrier aggregation (CA) activation.

9. The electronic device of claim 3, wherein the memory causes, when executed, the at least one processor to:
detect that the event is executed,
configure, based on a default tuning code, the at least one tunable antenna upon detecting an execution of the event,
measure the load after configuring the at least one tunable antenna,
generate an antenna tuning code based on the measured load,
allocate an index corresponding to the antenna tuning code, and
generate the first LUT, based on the event, the generated antenna tuning code, and the measured load.

10. A method of an electronic device, the method comprising:
measuring a load of at least one tunable antenna based on one reference point among a plurality of reference points for tuning; and
tuning the at least one tunable antenna based on the measured load,
wherein tuning the at least one tunable antenna based on the measured load comprises:
storing the plurality of reference points for tuning by each event;
obtaining an event;
obtaining, based on the obtained event, the reference point among the plurality of reference points for tuning;
configuring the at least one tunable antenna based on the obtained reference point;
measuring the load of the at least one tunable antenna after configuring the at least one tunable antenna;
selecting an antenna tuning code based on the measured load; and
reconfiguring the at least one tunable antenna based on the selected antenna tuning code.

11. The method of claim 10, further comprising obtaining a reference point corresponding to the obtained event for tuning each event.

12. The method of claim 10, further comprising:
comparing load information comprised in a first lookup table (LUT) with the measured load; and
selecting an antenna tuning code of a plurality of antenna tuning codes based on a result of comparison,
wherein the load information comprised in the first LUT is associated with the plurality of antenna tuning codes.

13. The method of claim 12, further comprising generating the first LUT,
wherein each of the plurality of antenna tuning codes is mappable to an event and an index, the load information comprised in the first LUT is associated with the event and the index mapped to the plurality of antenna tuning codes, and the selected antenna tuning code is indicated by the mapped event and index.

14. The method of claim 13, further comprising:
obtaining, based on the event and the index, the selected antenna tuning code using a second LUT for an antenna tuning code based on the event and the index; and
configuring the at least one tunable antenna based on the selected antenna tuning code.

15. The method of claim 10, wherein:
the configuring of the at least one tunable antenna is performed every second.

16. The method of claim 10, wherein the event comprises at least one of an insertion of an earphone into the electronic device, an insertion of a universal serial bus (USB), or an activation of carrier aggregation (CA) operation.

17. The method of claim 13, further comprising:
detecting that the event is executed;
configuring, based on a default tuning code, the at least one tunable antenna upon detecting an execution of the event;
measuring the load after configuring the at least one tunable antenna;
generating an antenna tuning code based on the measured load;
allocating an index corresponding to the generated antenna tuning code; and
generating the first LUT, based on the event, the generated antenna tuning code, and the measured load.

* * * * *